(12) United States Patent
Jedliński et al.

(10) Patent No.: US 12,485,373 B2
(45) Date of Patent: Dec. 2, 2025

(54) FILTER VALVE ASSEMBLY

(71) Applicant: Collins Engine Nozzles, Inc., West Des Moines, IA (US)

(72) Inventors: Marek Jedliński, Wrocław (PL); Mikolaj Niewodniczanski, Wysoka (PL); Lukasz Pabirowski, Wrocław (PL)

(73) Assignee: COLLINS ENGINE NOZZLES, INC., Des Moines, IA (US)

( * ) Notice: Subject to any disclaimer, the term of this patent is extended or adjusted under 35 U.S.C. 154(b) by 553 days.

(21) Appl. No.: 17/950,394

(22) Filed: Sep. 22, 2022

(65) Prior Publication Data

US 2023/0101135 A1 Mar. 30, 2023

(30) Foreign Application Priority Data

Sep. 24, 2021 (EP) .................................... 21461597

(51) Int. Cl.
*B01D 35/153* (2006.01)

(52) U.S. Cl.
CPC ........ *B01D 35/153* (2013.01); *B01D 2201/16* (2013.01); *B01D 2201/291* (2013.01)

(58) Field of Classification Search
CPC .............. B01D 35/153; B01D 2201/16; B01D 2201/291; B01D 27/08; B01D 35/147; B01D 27/103
USPC ................ 210/348, 117, 130, 136, 429, 418, 210/440–444, 450, 455, 232, 235
See application file for complete search history.

(56) References Cited

U.S. PATENT DOCUMENTS

| 4,127,484 A | 11/1978 | Walulik et al. |
| 4,872,976 A | 10/1989 | Cudaback |
| 4,876,857 A | 10/1989 | Feltz et al. |
| 6,068,763 A | 5/2000 | Goddard |

(Continued)

FOREIGN PATENT DOCUMENTS

| DE | 102018204255 A1 | 9/2019 |
| EP | 1350551 A1 | 10/2003 |
| IT | MI20111315 A1 | 1/2013 |

OTHER PUBLICATIONS

Abstract for DE102018204255 (A1), Published: Sep. 26, 2019, 1 page.

(Continued)

*Primary Examiner* — Madeline Gonzalez
(74) *Attorney, Agent, or Firm* — CANTOR COLBURN LLP

(57) ABSTRACT

A filter assembly includes a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet. The filter assembly further includes a valve assembly mounted inside the manifold that includes a valve piston and a valve spring arranged in engagement with the valve piston to bias the valve piston into a first position and to compress, in response to a pressure differential across the valve piston exceeding the spring force, to move the valve piston to a second position.

16 Claims, 6 Drawing Sheets

(56) References Cited

U.S. PATENT DOCUMENTS

| | | | |
|---|---|---|---|
| 7,029,575 B1 | 4/2006 | Baumann et al. | |
| 8,231,793 B2 | 7/2012 | Hacker et al. | |
| 2003/0127384 A1* | 7/2003 | Kapur | B01D 35/147 |
| | | | 210/416.5 |
| 2008/0083664 A1 | 4/2008 | Bontaz et al. | |
| 2018/0304179 A1 | 10/2018 | Auxter et al. | |

OTHER PUBLICATIONS

European Search Report for Application No. 21461597.3, mailed Feb. 24, 2022, 6 pages.

* cited by examiner

FILTER VALVE ASSEMBLY

CROSS-REFERENCE TO RELATED APPLICATIONS

This application claims priority to European Patent Application No. 21461597.3 filed Sep. 24, 2021, the entire contents of which is incorporated herein by reference.

TECHNICAL FIELD

The present disclosure is concerned with a valve assembly for a filter assembly such as, but not limited to, filters for fuel or oil or lubricant in machines or vehicles (e.g., a fuel filter in a vehicle or an aircraft).

BACKGROUND

Filters are provided in various applications to filter fluid flowing along a fluid flow path in order, for example, to remove particles or contaminants from the fluid. The present disclosure is concerned with the type of filter having a fluid inlet and a fluid outlet and a filter path between the inlet and the outlet, wherein the filter path passes through a filter medium arranged to remove the material to be filtered from the fluid before it arrives at the outlet. Such filters find use in e.g. vehicle fuel systems, where fuel is drawn from a reservoir by a pump and delivered to the engine. Filters are provided in the flow path to remove any particulate matter or debris and to ensure that the fuel reaching the engine is as clean as possible to avoid damage to the engine and permit optimal engine performance. Such filter assemblies may comprise a manifold with an inlet and outlet for connection to the fuel lines and a filter material. This may be provided in a filter cartridge removably attached to the manifold. Filters are also used to filter lubricant fluid such as oil In vehicles, and particularly in aircraft, the effectiveness and reliability of the filters is important for performance, efficiency and safety.

Over time, the filter material may become clogged presenting an impedance to the flow of fluid through the filter. To avoid the engine being cut off from the fuel supply when the filter medium is clogged, most fuel supply systems will provide a way to bypass the filter medium in the event of it becoming clogged since it is important for the engine to receive some fuel, even if it contains debris, rather than no fuel at all. The bypass system will allow fuel to flow to the engine until such time that the filter material can be replaced e.g. by removing and replacing the filter cartridge.

Current filter bypass systems tend to be large and complex and this adds considerably to the cost, weight and size of the filter assembly.

Further, as mentioned above, when the filter medium becomes clogged or has exceeded its useful or permitted life, it needs to be removed and replaced. Conventionally, this requires the fuel system, and therefore the engine, to be switched off while the filter medium is removed, leading to undesirable downtime.

There is a need for a bypass system for a filter assembly that is simple, small and lightweight whilst maintaining reliability. There is also a need for an automatic shut-off system that allows a filter to be removed and replaced without the need to shut-off the entire fuel system and to avoid leakage during removal of the filter cartridge.

SUMMARY

The assembly according to this disclosure is a valve assembly comprising a bypass valve and a shut-off valve that are integrated inside the housing or manifold of a filter assembly and that are automatically actuated.

According to an aspect of the disclosure, there is provided a filter assembly comprising: a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterised by the filter assembly further comprising a valve assembly mounted inside the manifold, the valve assembly comprising a valve piston and a valve spring arranged in engagement with the valve piston to bias the valve piston into a first position and to compress, in response to a pressure differential across the valve piston exceeding the spring force, to move the valve piston to a second position being a bypass position in which a bypass channel is opened to direct flow from the fluid inlet to the fluid inlet without passing through the filter medium, the valve assembly further comprising an adaptor ring located between the valve piston and the filter housing and provided with an annular seal, and wherein the valve piston is provided with a radially extending flange and an inner piston wall configured such that as the filter housing is being detached from the manifold, the valve spring expands to move the valve piston to a third, shut off position whereby the piston flange is in sealing engagement with the adaptor ring and the outlet seal and the inner piston wall is in sealing engagement with inlet seals such that flow from the inlet and the outlet is shut off from entering the filter housing.

Also disclosed is a fuel filter, a method of filtering fluid and a method of detaching the filter housing from the manifold.

Preferred embodiments of the invention will now be described in more detail, by way of example only, with reference to the drawings.

DETAILED DESCRIPTION

While the assembly of the disclosure is described in relation to fuel supply systems, this is by way of example only and the principles may apply equally to filters for lubricant or other fluids.

Figure 1:
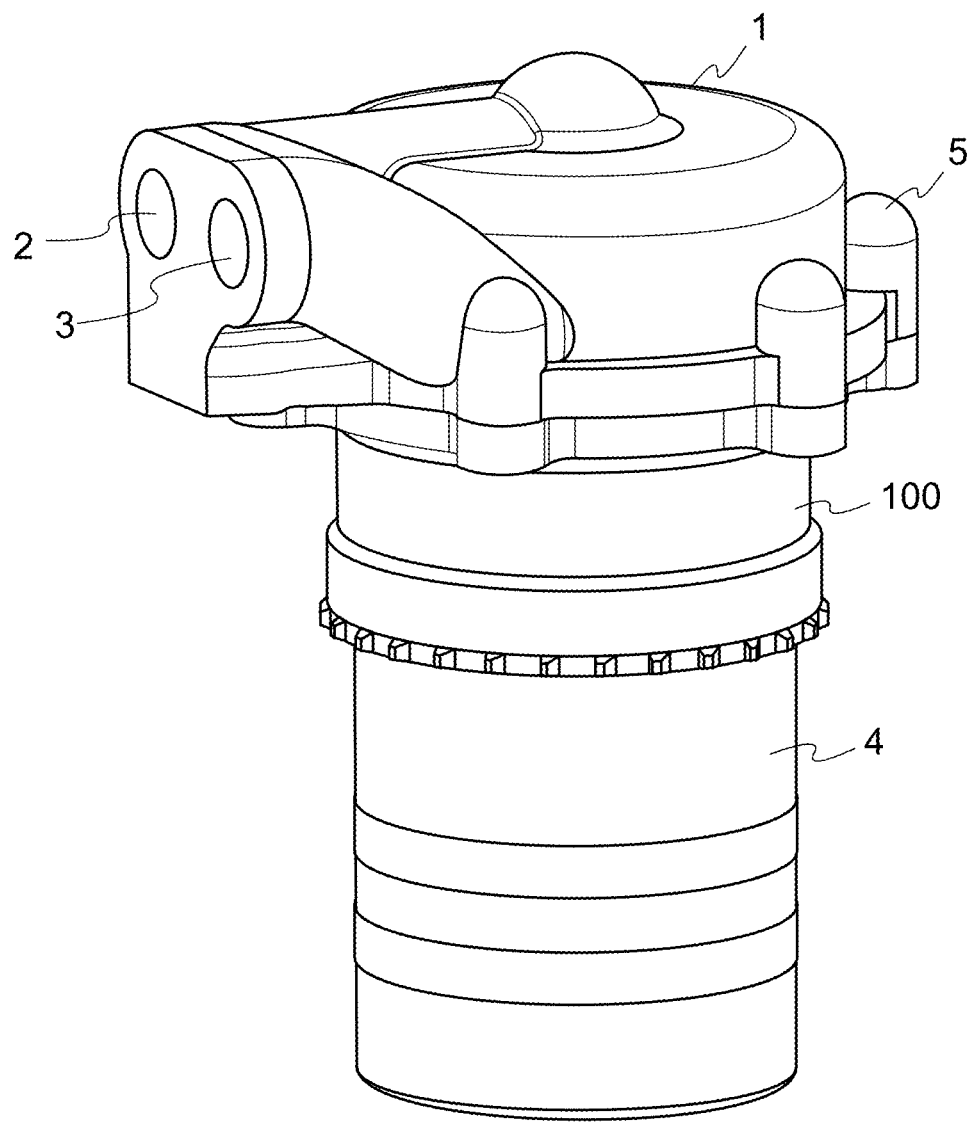
FIG. 1 is a perspective view of a filter assembly.
Figure 2:
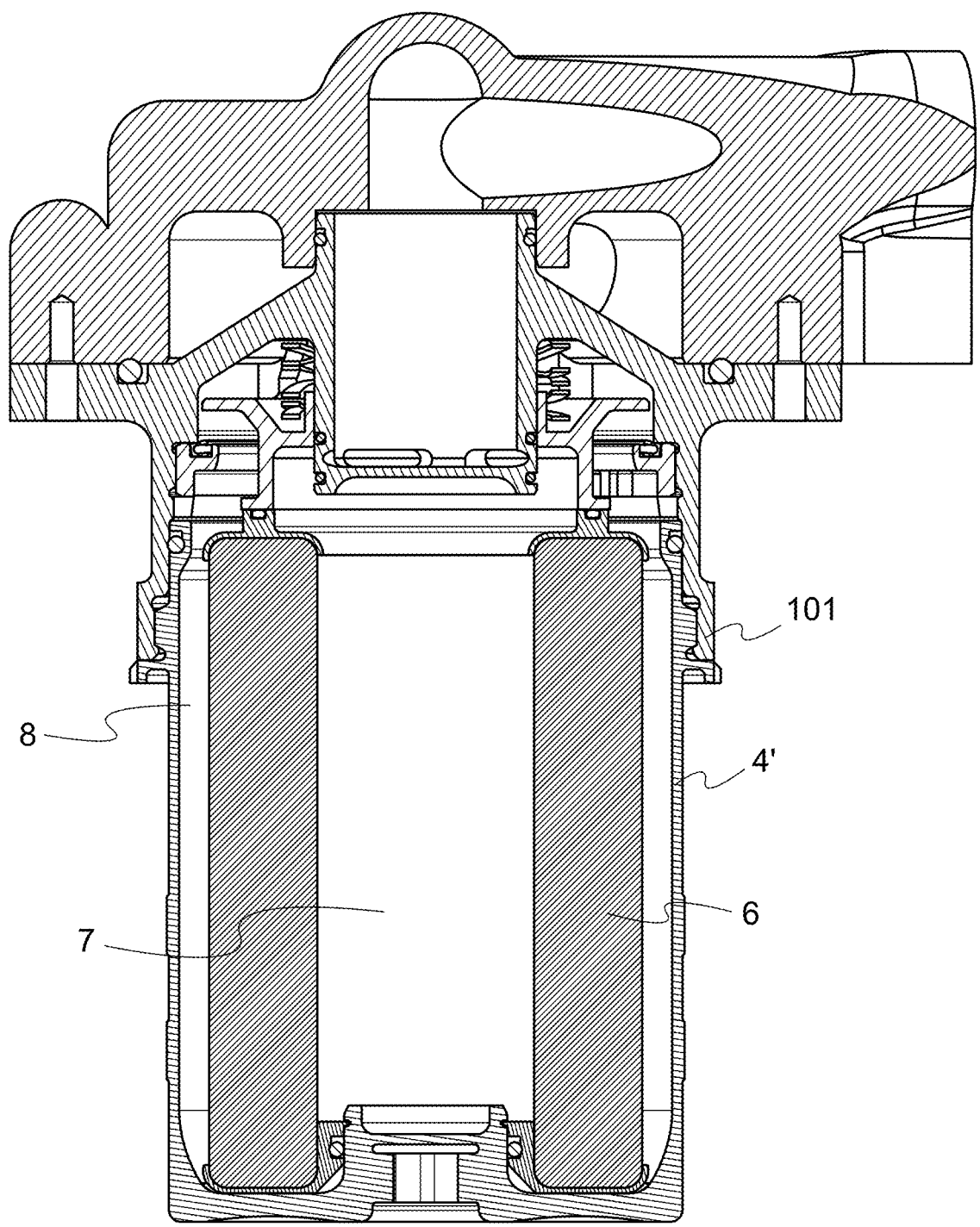
FIG. 2 is a cross-sectional view of a filter assembly as shown in FIG. 1 and in accordance with the disclosure.

FIG. 1 shows a filter assembly such as those used in fuel systems or the like. Such filters may be placed between the fuel reservoir and the fuel pump and/or between the pump and the engine, to remove debris, particulate matter etc. from the fuel before it reaches the engine. The outer shape and structure of the filter is as is known in the field and is designed to fit in a fuel supply system of the vehicle/aircraft etc. The aim of the present disclosure is to provide a by-pass and shut off system that can be integrated into such a filter assembly without changing the design or the envelope of the exterior of the assembly.

The filter assembly includes a filter manifold 1 having a fluid inlet 2 and a fluid outlet 3. The inlet 2 is configured to be connected to a fluid line from the reservoir or pump (not shown) supplying fluid/fuel to be filtered. The following description will refer to a fuel filter, but it should be understood that the fluid could be other than fuel and reference to fuel is by way of example only.

The outlet 3 is configured to be connected to a fluid line for providing the filtered fluid to the pump (if the filter is between the reservoir and the pump) or to the end user of the fluid e.g. the engine (if the filter is between the pump and the engine). The manifold 1 is attached to a filter canister or bowl 4 by a connector 100, which houses the valve assembly described further below, and fasteners 5. A threaded connector 101 is provided between the connector and the bowl 4. As will be described further below with reference to the other drawings, fluid provided to the filter inlet passes from the manifold 1 into the filter canister or bowl 4. The filter bowl 4 contains a filter medium 6 which may be e.g. in the form of a cartridge fitted into the bowl. The filter medium 6 which may be e.g. paper or other known filter material is formed to define an inner chamber 7. An outer chamber 8 is defined between the filter medium 6 and the inner wall 4' of the filter bowl 4. Fluid from the inlet, passing into the filter, is directed into the inner chamber 7. Due to the pressure of the pump and the build-up of pressure in the inner chamber the fluid is forced outwards through the filter medium 6 into the outer chamber 8 and is then forced up to and out from the outlet 3. This is known and standard for such filter assemblies.

As mentioned above, problems can arise when the filter medium 6 becomes clogged or defective such that the fluid in the inner chamber 7 is not able to pass through the filter medium into the outer chamber and to the outlet. The fluid (fuel) would then not reach the engine.

Further, when the filter medium needs replacing, with known assemblies, the fluid supply needs to be cut off to prevent fluid flowing into the inlet so that the bowl 4 can be disconnected from the manifold without fluid leakage, and replaced with new filter medium and reattached before the fluid flow can be re-started.

According to this disclosure, a valve assembly is provided to regulate fluid flow when it cannot pass through the filter medium. The valve assembly is integrated into and inside the manifold of the filter assembly.

Figure 4:
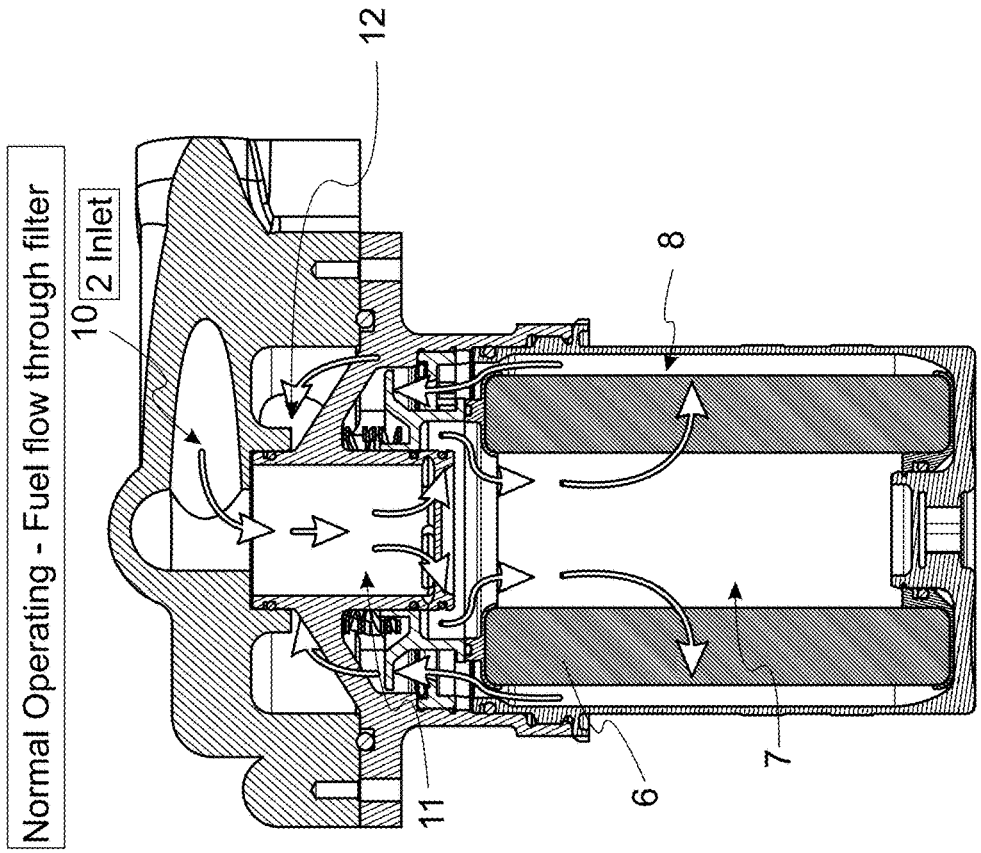
FIG. 4 shows the flow through the filter assembly in normal operation.
Figure 3:
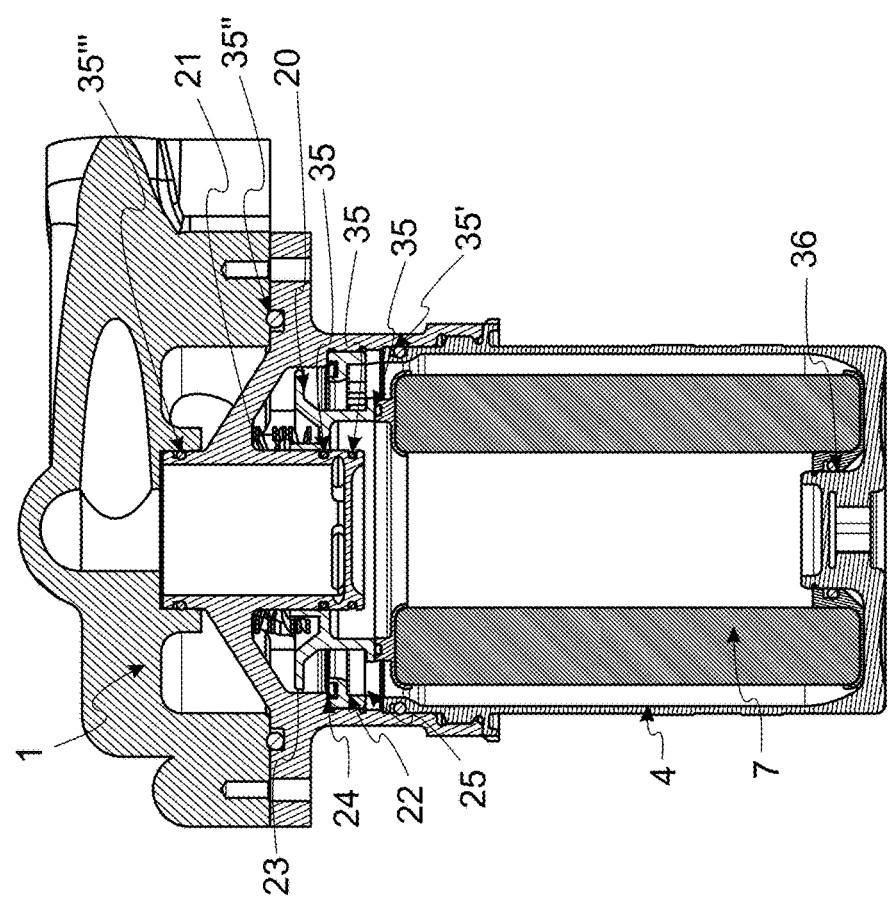
FIG. 3 show a sectional view of an assembly according to this disclosure.

In normal operation, the fluid e.g., fuel flows into the inlet 2 in the manifold 1, as best seen by the arrows in FIG. 4. The fuel flows into a supply chamber 10 and along a supply channel 11, from where it flows into the inner chamber 7 of the filter. The fuel flows, under pressure of the pump, through the filter medium 6, where debris or contaminants are filtered from the fluid and retained in the filter medium 6. The filtered fluid then flows from the outer chamber 8 to an outlet channel 12 and out of the filter via the outlet 3 of the manifold 1.

As mentioned above, the filter can become clogged and will, after a while, need to be removed and replaced. The valve assembly of this disclosure, as described in more detail below, acts to direct the fuel via a bypass channel 13 in the event that the filter becomes clogged, as indicated by an excessive pressure differential between valve control areas (as described further below and due to the pressure in the inner chamber increasing because the flow through the filter medium is hindered), thus bypassing the filter medium. This ensures that in such an event, fuel will continue to be provided to e.g., the engine even in the event that the filter is not usable. Of course, the output fuel will not be filtered, but some (unfiltered) fuel is preferable to no fuel at all.

The valve assembly also operates to shut off fuel flow through the filter in the event that the filter bowl 4 is removed e.g., for maintenance, so as to prevent fuel leakage. The shut off function shuts off the supply channel and, optionally, may also shut off the outlet chamber.

The valve assembly is located entirely within the envelope of the filter defined by the manifold, the connector and the filter bowl, and comprises a valve piston 20, a valve spring 21 and seals to prevent fluid flow at certain locations according to the position of the piston, as will be described below.

The cooperation of the piston, spring and seals provides both a bypass function and a shut off function using the same components and, in particular, using just one spring and one piston. As springs are typically expensive components and prone to damage in fluid systems, this is an important advantage of the assembly of this disclosure.

The valve assembly includes the valve piston 20 that is mounted around the supply chamber 10 and the valve spring 21, also mounted about the supply chamber and in engagement with the piston to cause axial movement of the piston depending on pressure differentials in the valve assembly. The piston is provided with a radially extending flange 23 that, in a closed position, abuts against an adapter ring 22 provided around the interior of the connector 100 at the interface of the connector and the filter bowl 4. A seal 24, e.g., a lip seal, is provided around the adaptor ring 22 such that when the piston flange 23 abuts against the adapter ring 22 it comes into sealing engagement with the seal 24. A cap ring 25 is mounted to the top of the filter bowl 4 at the interface between the bowl 4 and the connector 100. The cap ring 25 may be attached to the filter bowl by press fitting or the like.

Seals, e.g. O-rings 35, 35', 35", 35''', 36 are provided at various locations in the system to prevent leakage of the fluid flowing through the system. One of these seals 36 is provided where the filter medium 6 fits to the bottom of the filter bowl 4.

The bypass operation will now be described in more detail with reference to FIG. 5. The valve piston 20 is positioned in relation to the bypass channel 13 defined between the piston 20 and the cap ring on the top of the filter bowl 4, and moved relative thereto by means of the valve spring 21 and the pressure differential across the piston corresponding to inlet pressure p1 and outlet pressure p2. In normal operating conditions, as shown in FIG. 4, the pressure differential across the piston does not exceed the force of the spring 21 biasing the piston to its closed position. In this position, the piston abuts against the cap ring 25 (via a seal e.g., and O-ring in one embodiment) so that there is no gap between the abutting piston and cap ring to define a bypass channel 13 for the fluid. Fluid cannot, therefore, flow from the supply channel between the piston and the filter bowl and so is directed through the supply channel and through the filter medium as described above.

Figure 5:
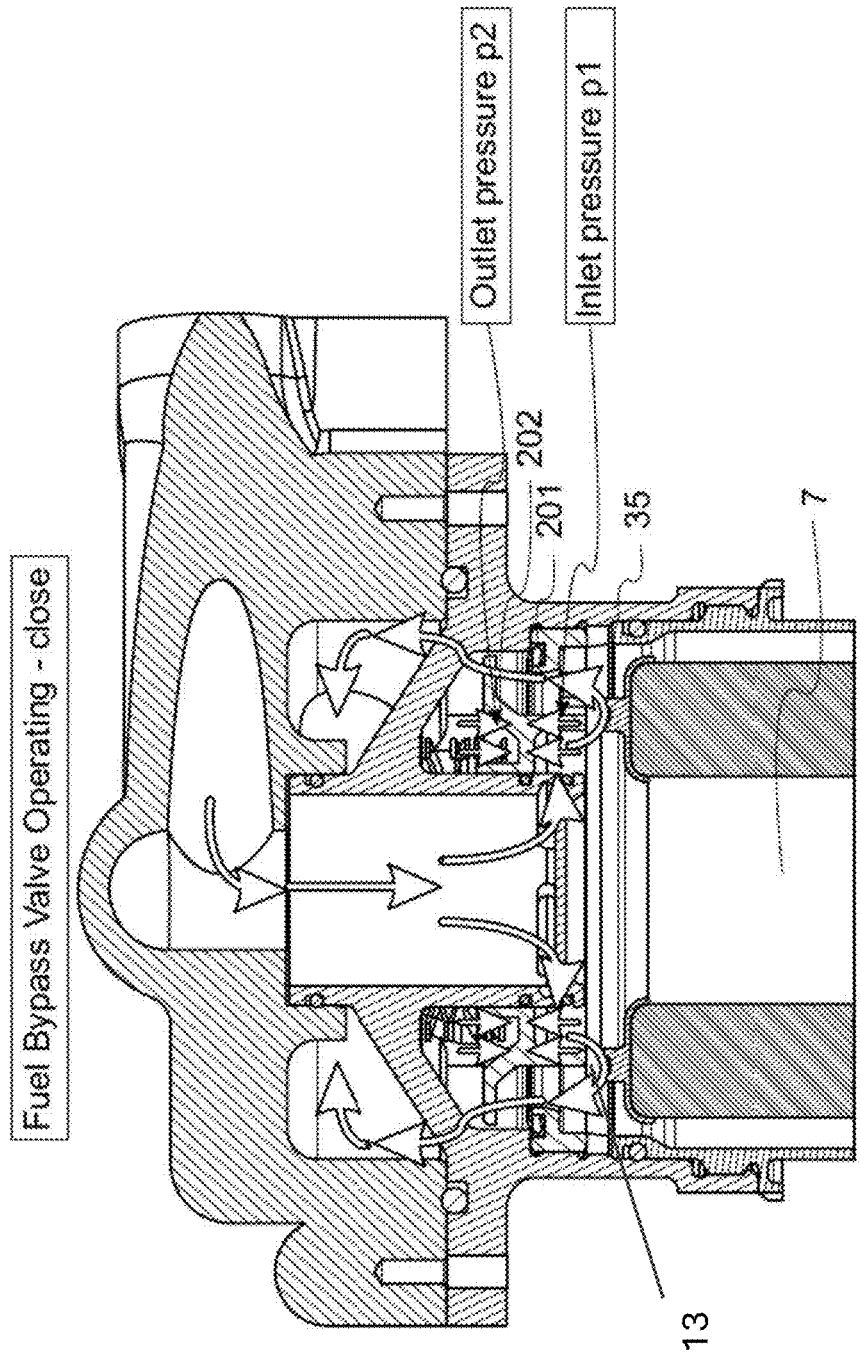
FIG. 5 shows the flow through the filter assembly in bypass operation.

If, however, the pressure in the inner chamber 7 becomes excessive and so the pressure differential p1-p2 across control surfaces 201, 202 of the piston 20 exceeds the spring force, the valve piston 20 is pushed against the spring force, as seen in FIG. 5, which creates a gap, or bypass channel 13, between the piston and the cap ring, thus allowing for flow directly from the inlet to the outlet, bypassing the filter medium. Fuel entering the inlet is thus directed, as shown by the arrows in FIG. 5, from the supply chamber through the bypass channel 13, from where it flows to the outlet chamber and to the outlet 3 without passing through the filter medium 6.

Thus, bypass valve spring 21 controls the movement of the spool 20 based on the filter pressure difference, to open the bypass channel 13 if the pressure difference exceeds the predetermined threshold. The spring itself, however, is not located in the fluid flow path, but, rather, in a 'blind' cavity defined by the piston and the flange. If the spring were in the fluid flow path, the fluid flow could excite the spring and cause resonance in the fluid. A spring in the fluid flow path would also disturb the flow. Further, if the spring were to be damaged, spring material could create debris in the system fluid flow, which could further damage the system.

When the pressure difference decreases again, the piston will move, under the force of the spring, back to the default position where the bypass channel is closed by the piston abutting against the cap ring/seal and the fluid is then forced again from the supply chamber into the inner chamber, through the filter medium to the outer chamber and the outlet channel and out through the outlet.

The same valve assembly components are also configured to perform a shut off function that shuts off fuel flow when the filter bowl 4 is removed from the manifold 1 e.g., for maintenance. The shut off function is described with reference to FIGS. 6A to 6C.

Figure 6:
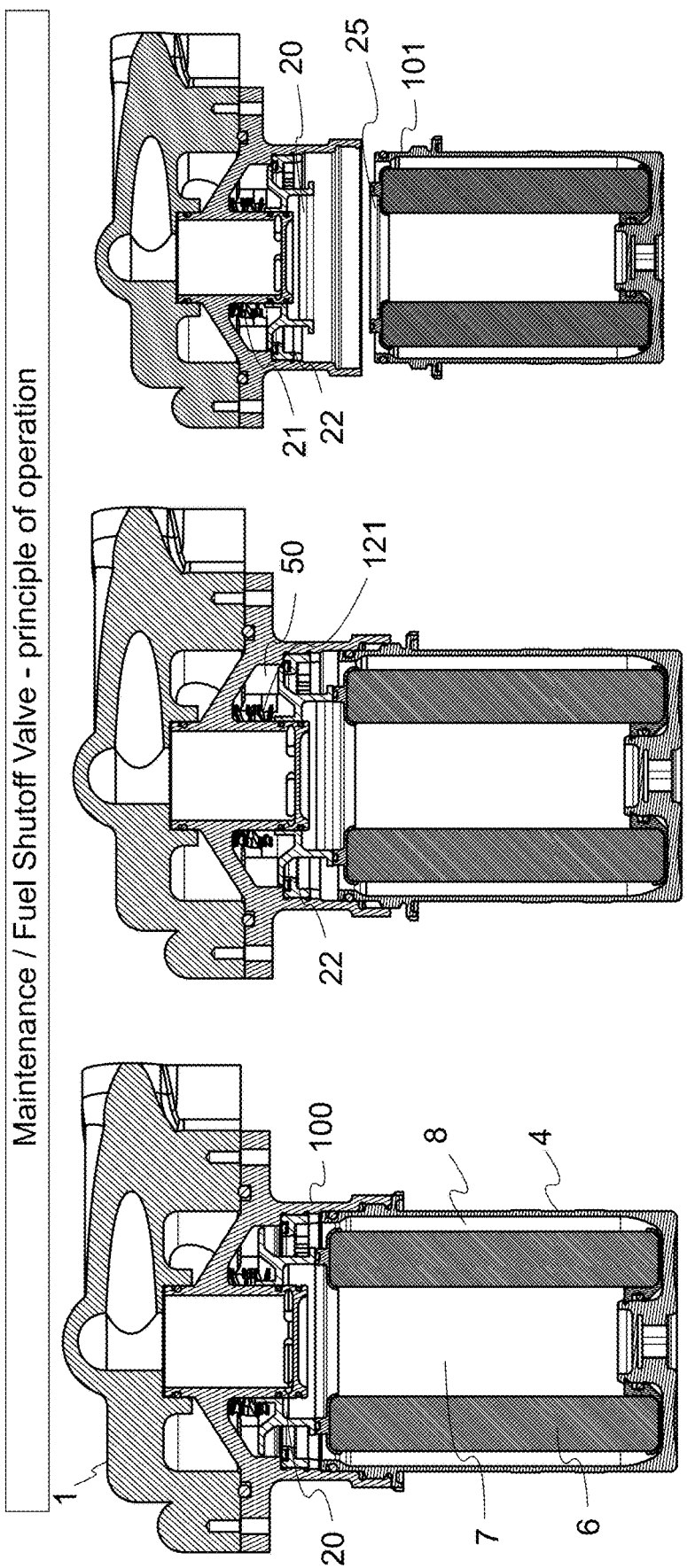
FIGS. 6A, 6B and 6C show operation of the shut off valve function.

FIG. 6A shows the manifold 1, connector/valve housing 100 and filter bowl 4 assembled as described above.

To remove the filter bowl 4, it is unscrewed from the connector 100 using the thread 101. FIG. 6B shows the assembly as the bowl is being unscrewed. FIG. 6C shows the filter bowl removed from the manifold 1.

Figure 7:
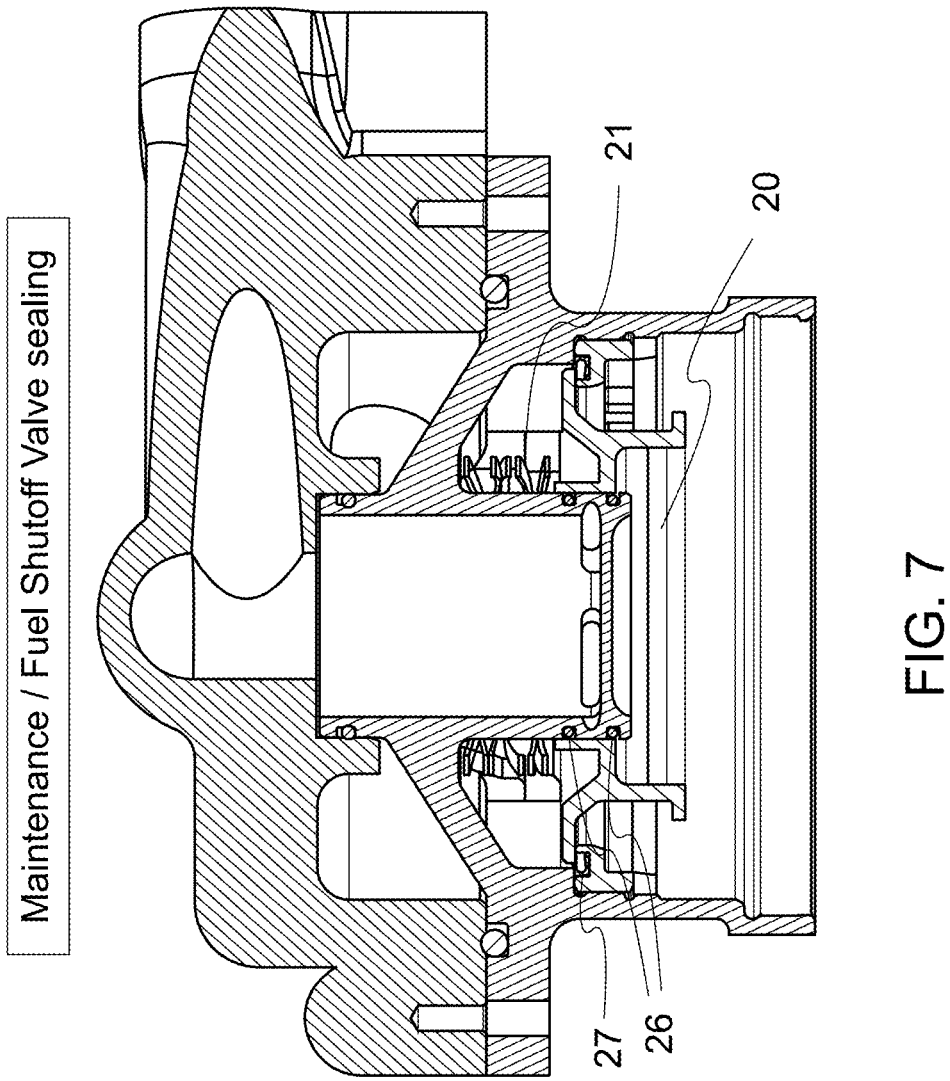
FIG. 7 shows the seals for the shut off function in close-up.

FIG. 7 shows in detail the valve assembly components that cooperate to provide the shut off function. The shut off valve components include the valve piston 20 and valve spring 21 that also perform the bypass function. To perform the shut off function, the piston cooperates with an adaptor ring 22 located inside the connector 100 between the cap ring 25 and the flange 23 of the piston. Inlet seals 26 are provided between the piston 20 and the inlet/supply channel. This may be an O-ring or the like to provide axial sealing. An outlet seal 24 is provided on the adapter ring 22 between the piston 20 and the assembly outlet 3. In the example shown, this is a lip seal and provides axial sealing. Other types of seal can also be envisaged to provide the required axial sealing at the inlet and outlet. What is important is then when the piston, acting as a shut off valve is in the closed position (as described further below) both the inlet and outlet are sealed to avoid an fluid leakage at either the inlet or the outlet.

FIG. 6A shows the manifold 1, connector/valve housing 100 and filter bowl 4 assembled as described above.

To remove the filter bowl 4, it is unscrewed from the connector 100 using the thread 101. The filter bowl 4 may also be secured to the connector by a latch (not shown) which is also opened to release the bowl. FIG. 6B shows the assembly as the bowl is being unscrewed. FIG. 6C shows the filter bowl removed from the manifold 1.

The filter bowl 4 contains the filter medium 6 which is in the form of a cylinder with a top part provided with a cap ring 25 provided to add rigidity to the filter medium 6 for attachment of the flow paths and valve assembly parts. In normal operation, when the filter bowl 4 is attached to the manifold 1 via the connector 100 (FIG. 6A), the valve spring 21 is compressed by the attachment of the filter bowl 4 such that the flange 23 of the piston 20 is held out of engagement with the adaptor ring 22. The inlet and outlet axial seals 26, 24 are therefore not in sealing engagement with the flange 23 and do not, therefore, prevent flow of the fluid from the inlet channel into the filter or from the filter to the outlet.

As the filter bowl starts to be unscrewed from the connector (FIG. 6B) this releases the force acting on the valve spring 21 via the piston 20 being pressed by contact with the filter bowl 4 and as the spring 21 expands it forces the piston axially downwards bringing the flange into engagement with the adaptor ring and the outlet seal 24. At the same time, the piston moves to sealingly engage with the inlet seals 26 to thus prevent flow of fluid at the inlet and outlet. Once the shut off valve piston 20 is in a position that the inlet and outlet seals are in proper sealing engagement, the filter bowl 4 can be fully detached (FIG. 6C) without the risk of fluid leakage from the manifold/connector. The geometry of the shut off valve parts and the design of the valve spring are such that the valve in its shut off function will be in its fully sealed closed position before the filter bowl 4 is disconnected. The flange 23 of the piston in engagement with the adaptor ring defines a chamber 50 where the spring 21 is located to protect the spring from fluid in the system and from debris.

The outlet seal 24 being provided on the adaptor ring 22 provides the required outlet sealing for the shut off function and also secures the piston 20 against falling out of the connector/manifold after the bowl 4 is removed.

Thus, a single valve assembly of a piston, spring and seals, mounted inside the filter assembly, performs both a bypass function and a shut off function when required.

The valve assembly of this disclosure can be located inside existing manifold designs and thus does not increase the envelope of the filter assembly. The valve assembly is relatively simple, small and lightweight and enables simple, quick and less frequent maintenance without fuel loss. Only a single spring is required for the valve assembly, which is advantageous because springs are expensive components. Further, the failure of any one valve component will not cause the loss of filter function. The valve assembly is reliable and durable thus reducing the costs and time of maintenance.

The invention claimed is:

1. A filter assembly comprising:
a manifold having a fluid inlet and a fluid outlet;
a filter housing having a filter medium provided therein,
the filter medium defining an inner filter chamber and
defining an outer filter chamber between the filter
medium and the filter housing,
the filter housing being removably attached to the
manifold so as to provide a fluid flow path from the
inlet into the inner filter chamber, through the filter
medium into the outer chamber and out of the outlet;
a valve assembly mounted inside the manifold, the valve
assembly comprising:
a valve piston;
a valve spring arranged in engagement with the valve
piston to bias the valve piston into a first position, in
which fluid flows from the fluid inlet into the inner
filter chamber, through the filter medium into the
outlet chamber and out of the fluid outlet and to
compress, in response to a pressure differential
across the valve piston exceeding the spring force, to
move the valve piston to a second position being a
bypass position in which a bypass channel is opened to direct flow from the fluid inlet to the fluid outlet without passing through the filter medium;

an adaptor ring located between the valve piston and the filter housing and provided with an annular outlet seal, wherein the valve piston is provided with a radially extending flange and an inner piston wall configured such that as the filter housing is being detached from the manifold, the valve spring expands to move the valve piston to a third, shut off position whereby the piston flange is in sealing engagement with the adaptor ring and the annular outlet seal and the inner piston wall is in sealing engagement with inlet seals such that flow from the inlet and the outlet is shut off from entering the filter housing; and wherein the valve spring is located in a blind cavity outside of the path of the fluid flow through the assembly.

2. The filter assembly of claim 1, wherein the annular outlet seal is a lip seal.

3. The filter assembly of claim 1, further comprising a cap ring mounted to the top of the filter housing;

wherein, in the first position, the valve piston abuts against the cap ring and wherein, in the bypass position, the bypass channel is defined between the valve piston and the cap ring.

4. The filter assembly of claim 1, further comprising:

a supply chamber between the fluid inlet and the inner filter chamber.

5. The filter assembly of claim 4, further comprising:

a supply channel fluidly connecting the supply chamber and the inner filter chamber.

6. The filter assembly of claim 1, further comprising:

an outlet chamber between the outer filter chamber and the fluid outlet.

7. The filter assembly of claim 1, further comprising:

sealing means between the manifold and the filter housing.

8. A fuel filter arranged between a fuel supply and a fuel application and comprising:

the filter assembly of claim 1, wherein the inlet is arranged to be connected to the fuel supply and the outlet arranged to be connected to the fuel application.

9. A method of providing fluid from a fluid source to a fluid application via a filter assembly as claimed in claim 1, the method comprising:

providing fluid from the fluid source to the fluid inlet, the fluid passing through the filter medium to provide filtered fluid to the fluid application via the fluid outlet, and wherein fluid is caused to flow from the inlet to the outlet without passing through the filter medium in response to the pressure differential across the valve piston exceeding the spring force.

10. A method of removing the filter housing from the manifold of the filter assembly as claimed in claim 1, the method comprising:

rotating the filter housing relative to the manifold until the piston is in the shut off position and then detaching the filter housing from the manifold by further rotation of the filter housing relative to the manifold.

11. The method of claim 9, wherein the annular outlet seal is a lip seal.

12. The method of claim 9, wherein the assembly further includes a cap ring mounted to the top of the filter housing;

wherein, in the first position, the valve piston abuts against the cap ring and wherein, in the bypass position, the bypass channel is defined between the valve piston and the cap ring.

13. The method of claim 9, wherein the assembly further includes a supply chamber between the fluid inlet and the inner filter chamber.

14. The method of claim 13, wherein the assembly further includes a supply channel fluidly connecting the supply chamber and the inner filter chamber.

15. The method of claim 9, wherein the assembly further includes an outlet chamber between the outer filter chamber and the fluid outlet.

16. The method of claim 9, wherein the assembly further includes sealing means between the manifold and the filter housing.

* * * * *